Figure 1:
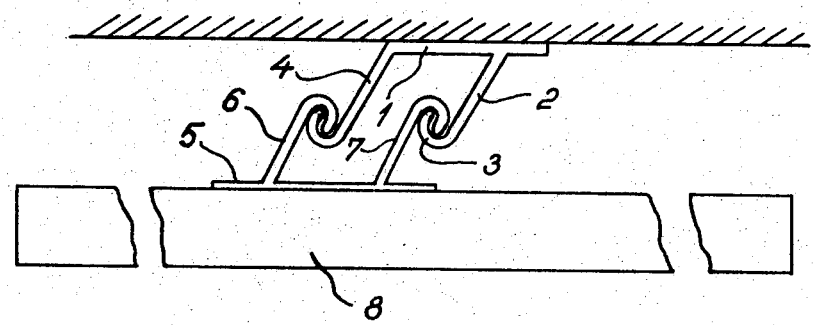

United States Patent

[11] 3,625,367

[72] Inventor Rene Morck
　　　　　　　Ballerup, Denmark
[21] Appl. No. 20,533
[22] Filed Mar. 18, 1970
[45] Patented Dec. 7, 1971
[73] Assignee A/S Platex-Plastartikler
　　　　　　　Frederiksvaerk, Denmark

[54] SUSPENSION FOR ENVELOPES CONTAINING GRAMOPHONE RECORDS OR THE LIKE
　　　5 Claims, 2 Drawing Figs.

[52] U.S. Cl. .................................................. 211/40
[51] Int. Cl. ................................................ A47g 29/00
[50] Field of Search ................................... 211/40, 46, 45

[56] References Cited
UNITED STATES PATENTS
| 1,194,536 | 8/1916 | Oliver | 312/12 |
|---|---|---|---|
| 2,812,067 | 11/1957 | Gussack | 211/46 |
| 2,851,167 | 9/1958 | Rosenberg | 211/46 |
| 2,975,904 | 3/1961 | Krebs | 211/46 |
| 3,207,318 | 9/1965 | Gilbert | 211/40 |
| 3,298,374 | 1/1967 | Grundell | 211/46 X |
| 3,502,222 | 3/1970 | Crafoord | 211/40 |

Primary Examiner—Nile C. Byers, Jr.
Attorney—Raymond A. Robic

ABSTRACT: Suspension for envelopes containing gramophone records or the like and consisting of suspension rails having movable slides secured to envelope suspension elements extending at right angles to the rails. Each suspension element is formed as a tube having a slot at the bottom and is adapted to slidingly receive a web permanently attached to the upper edge of the envelope.

PATENTED DEC 7 1971 3,625,367

INVENTOR
René MØRCK
BY
[signature]
ATTORNEY

SUSPENSION FOR ENVELOPES CONTAINING GRAMOPHONE RECORDS OR THE LIKE

The invention relates to a suspension for envelopes containing gramophone records or the like and consisting of suspension rails having movable slides which are secured to envelope suspension elements extending at right angles to the rails.

From British Pat. specification No. 674,062 is known a suspension of this kind, by which the suspension element in the form of a channel-shaped metal strip is permanently attached to the upper edge of the envelope. The suspension element is slidable at right angles to the rails in relation to the slides, whereby it is possible to select an envelope and pull it forward in relation to the other envelopes. It will now be possible to open the envelope and remove the gramophone records. This device is unsuited for the lending-department of libraries, because the envelope does not accompany the record, when the latter is removed.

From French Pat. specification No. 1,050,045 is known a suspension device from gramophone record envelopes, by which each envelope has a permanently fixed suspension element which is slidable on the suspension rails. Thus, when a record is removed, the envelope is removed at the same time, but also the suspension element will be removed, so that it will be necessary for the lending-department to dispose of a very large number of suspension elements corresponding to the total number of records. Furthermore, there is a risk of damage to the suspension elements during the lending period.

The object of the invention is to form the suspension device in such way, that it will be easy to remove the gramophone record and the envelope from the suspension element, and so that the suspension element will remain, when a record is lent.

This is according to the invention obtained by the fact that each suspension element is formed as a tube having a slot at the bottom thereof and being adapted to slidingly receive a web permanently attached to the upper edge of the envelope.

In this way, the envelope containing the record will be suspended securely by the suspension element, and it is easy to slide the envelope out of and into the suspension element, whereby the web slides in the interior of the tube, while the envelope passed through the slot at the bottom of the tube. When a gramophone record is lent, the suspension element will remain in the library and can be used for suspending another record being returned from lending.

The total number of suspension elements can thereby be reduced appreciably, and there is no risk of damage to the suspension elements during the lending period.

Figure 2:
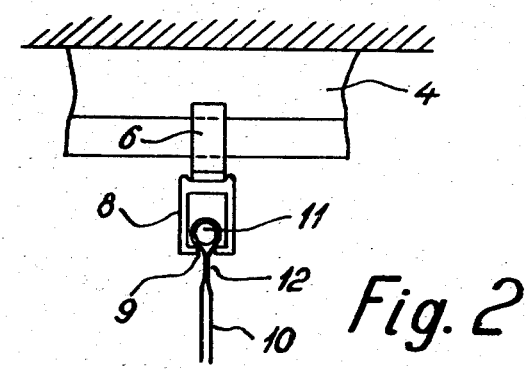

The invention will be explained more in detail in the following with reference to the drawings, in which:

FIG. 1 is an end view of a suspension device for gramophone record envelopes according to the invention, and FIG. 2 is another view of the same seen from the left side of FIG. 1.

In FIG. 1 is shown two suspension rails made as a single unit in the form of a double rail having a horizontal web 1 being glued or screwed onto the top of a cabinet or the like. The double rail has an obliquely downward extending flange 2, being provided at the lower end with a hook-shaped bend 3. At a distance from the flange 2 there is another corresponding flange 4 having a similar hook-shaped bend.

In the double rail can be suspended one or more slides 5 being provided with two upward extending lugs 6 and 7 being provided with hook-shaped portions engaging the hook-shaped portions of the flanges 4 and 2, respectively.

This will prevent the slide 5 from turning in relation to the double rail and from inadvertent disengagement from the double rail, when the slide receives a push upward. However, the slide can easily be moved along the rail, and can also easily be lifted off and placed upon the rail by a movement of the slide in an oblique direction. On the other hand, it is more unlikely that a slide 5 could drop down from the double rail by some casual push.

Each slide 5 is attached in the middle of the upper side of a tube 8 having a rectangular cross section and being provided at the bottom with a through-going slot 9 for the insertion of a record envelope 10, see FIG. 2. The envelope 10 has along the upper edge a plastic rod 11 being surrounded by the material of the envelope. Under the plastic rod 11 the two layers of the envelope are attached to each other by a welding 12.

The envelope 10 can be inserted and removed by sliding it along the tube 8. During inspection of a number of record envelopes, the envelopes will move parallel to each other, and they will be suspended in a horizontal position, so that it is easy to read the text. A record envelope 10 together with the tube 8 and the slide 5 can easily be removed from a cabinet and placed in another cabinet having a corresponding double rail.

Instead of using a double rail, it is possible to apply single rails, for instance of the shape which results, if the web 1 is cut through along the longitudinal middle line.

I claim:

1. A suspension device for envelopes containing gramophone records or the like, comprising a suspension rail adapted to be fixed to a top member, the said suspension rail having at least a pending flange and a hook-shaped bend at the lower edge of the flange, a slide member having at least an upright lug and a hook-shaped bend at the upper end of the said lug, the hook-shaped bend of the lug being oriented to removably engage the hook-shaped bend of the suspension rail, a tubular member fixed to said slide at right angle to said suspension rail, the said tubular member is provided with a slot at the bottom thereof, the said slot being adapted to support an envelope along one of its edge.

2. A suspension device as recited in claim 1, wherein the suspension rail has two spaced pending flanges with a hook-shaped bend along each flange, and the slide has two spaced upright lugs with a hook-shaped bend at the top of each lug, the flanges and the lugs being similarly spaced so that their respective hook-shaped bends removably engaged to each other.

3. A suspension device as recited in claim 2, wherein the said flanges and the said lugs are inclined relative to the vertical.

4. A suspension device as recited in claim 3, wherein the said flanges and the said lugs are similarly inclined relative to the vertical.

5. The suspension device as recited in claim 1, wherein the slot is adapted to receive a bead fixed along one edge of the envelope.

* * * * *